(12) United States Patent
Zhu

(10) Patent No.: US 11,198,143 B2
(45) Date of Patent: Dec. 14, 2021

(54) UNDERGROUND CHARGING PILE FOR NEW ENERGY VEHICLE

(71) Applicant: Gong Zhu, Xiamen (CN)

(72) Inventor: Gong Zhu, Xiamen (CN)

( * ) Notice: Subject to any disclaimer, the term of this patent is extended or adjusted under 35 U.S.C. 154(b) by 0 days.

(21) Appl. No.: 17/026,332

(22) Filed: Sep. 21, 2020

(65) Prior Publication Data

US 2021/0205829 A1 Jul. 8, 2021

(30) Foreign Application Priority Data

Jan. 8, 2020 (CN) .......................... 202010016366.3

(51) Int. Cl.
| | |
|---|---|
| *B05B 9/03* | (2006.01) |
| *B60L 53/35* | (2019.01) |
| *B60L 53/31* | (2019.01) |
| *B60L 53/30* | (2019.01) |
| *A01G 25/02* | (2006.01) |
| *E03F 5/10* | (2006.01) |
| *B60L 53/302* | (2019.01) |

(52) U.S. Cl.
CPC .............. *B05B 9/035* (2013.01); *A01G 25/02* (2013.01); *B60L 53/30* (2019.02); *B60L 53/31* (2019.02); *B60L 53/35* (2019.02); *E03F 5/10* (2013.01); *B60L 53/302* (2019.02)

(58) Field of Classification Search
CPC ......... B05B 9/035; B05B 9/047; A01G 25/02; B60L 53/30; B60L 53/302; B60L 53/31; B60L 53/35; E03F 5/10; E03F 5/105; Y02T 10/70; Y02T 10/7072; Y02T 90/12; Y02T 90/16

USPC ......................................................... 320/109
See application file for complete search history.

(56) References Cited

U.S. PATENT DOCUMENTS

| | | | | |
|---|---|---|---|---|
| 4,251,993 | A * | 2/1981 | Vancil ....................... | B63C 3/06 60/537 |
| 2012/0273519 | A1* | 11/2012 | Marshall .................. | B67D 7/04 222/52 |
| 2013/0307477 | A1* | 11/2013 | Reinschke .......... | B60L 11/1824 320/109 |
| 2014/0346099 | A1* | 11/2014 | Brantley ................... | E03B 3/02 210/127 |
| 2015/0306974 | A1* | 10/2015 | Mardall .................. | B60L 58/26 320/150 |

FOREIGN PATENT DOCUMENTS

| CN | 207015177 U | | 2/2018 |
|---|---|---|---|
| CN | 207207777 U | * | 4/2018 |

* cited by examiner

*Primary Examiner* — Cody J Lieuwen

(57) ABSTRACT

An underground charging pile for new energy vehicle has a green plant, a buried pit, and a charging pile. The buried pit has a water storage device having two water storage tanks, each tank is communicated with the buried pit, a group of propulsion springs are fixed to the two water storage tanks, the two propulsion springs are fixedly provided with a pushing, an upper end of the charging pile is fixedly provided with a cover plate, a bottom of the charging pile is fixedly provided with a supporting plate, a lifting rod is fixed between a lower of the supporting plate and a lower of the buried pit, a water spraying device is arranged to two side walls of the buried pit.

1 Claim, 16 Drawing Sheets

UNDERGROUND CHARGING PILE FOR NEW ENERGY VEHICLE

CROSS-REFERENCE TO RELATED APPLICATIONS

This application claims priority benefit of Chinese Patent Application No. 202010016366.3 filed on 8 Jan. 2020. The above-referenced application is hereby incorporated herein by reference.

BACKGROUND OF THE INVENTION

The invention relates a field of new energy automobiles, especially to an underground charging pile for new energy vehicle.

With increasing awareness of environmental protection and development of new energy vehicles, use of charging cars is increasing, and area for setting up car charging piles is more extensive. Charging piles are set up in general residential areas. Therefore, charging piles have become an indispensable electrical equipment in modern communities. Currently, most of charging piles are always installed on the ground, and may be damaged by the sun, wind and rain regardless of whether they are used or not. For office workers with a general life pattern, charging time of a vehicle is at night, so that charging piles are mostly not in use during the day, so that charging piles are damaged in vain during the day, resulting in reduction in service life, and finally charging piles on the ground are inevitably threatened by vehicles, and are most likely to be damaged by accidental impacts, making charging piles ineffectively protected. Therefore, there is an urgent need for a charging pile that can increase its service life.

BRIEF SUMMARY OF THE INVENTION

The present invention aims to provide an underground charging pile for new energy vehicle so as to solve the problem that charging piles can be damaged easily.

Such object is achieved by providing an underground charging pile for new energy vehicle as defined in claim 1. Further advantageous according to the invention will be apparent from dependent claims.

The invention provides an underground charging pile for new energy vehicle comprises a green plant area arranged on ground, a buried pit, and a charging pile, wherein a water storage device is arranged to the buried pit, the water storage device comprises two water storage tanks, each one of the water storage tanks is communicated with inside of the buried pit, a group of propulsion springs are fixed to inner bottom of the two water storage tanks, upper ends of the two propulsion springs are fixedly provided with a pushing plate which is in sealing and sliding connection with an inner wall of the corresponding water storage tank, an upper end of the charging pile is fixedly provided with a cover plate which is in sealing and sliding connection with an inner wall of the buried pit, a bottom of the charging pile is fixedly provided with a supporting plate which is in sealing and sliding connection with the inner wall of the buried pit, a lifting rod and a corrugated pipe are fixed between a lower of the supporting plate and a lower of the buried pit, a water spraying device is arranged to two side walls of the buried pit.

Advantageous Effects (1) By setting a buried pit, when charging is needed, a lifting rod is activated to make a charging pile rise to the ground to complete a charging operation. After the charging operation is completed, the lifting rod shrinks to move the charging pile down to the buried pit, so that the charging pile will not be exposed to the ground when not in use, thereby reducing damage caused by wind and rain, and increasing service life of the charging pile. It can effectively avoid accidental impact of a vehicle on the charging pile, making use of the charging pile safer.

(2) Through sealing effect of a cover plate, when a charging pile is located in a buried pit, external debris do not directly enter the buried pit or directly contact the charging pile, that protects the charging pile. Rainwater entering the buried pit is squeezed into the water storage tank through a supporting plate, so that the charging pile is not soaked or corroded by rainwater, so that service life of the charging pile is further improved.

(3) When it rains, rainwater is stored in a water storage tank. In a process of moving a charging pile up, rainwater is sprayed out through a first spraying pipe to irrigate a green plant area. In a process of moving the charging pile down, rainwater is sprayed out through a second spraying pipe to realize a re-irrigation of rainwater to the green plant area. In addition, up and down movements of the charging pile can automatically fill the corresponding reserved box with water, so that irrigation process can be cycled, and rainwater can be fully utilized.

(4) Watering time for green plant area is concentrated in a process of moving up and down a charging pile, which happens to be the time when charging starts and ends. For office workers with a general life pattern, vehicles are used during the day and vehicles are charged at night, that is, vehicles are basically charged at night and ends in the morning. As a result, watering time of green plant area is morning and evening, which is completely in line with watering time of plants, can achieve a good watering effect, and reduce a cost of manpower watering.

(5) In a case of continuous heavy rainfall, a water storage tank is filled with rainwater. At this time, excess rainwater in a buried pit is sprayed at the same time from a first spraying pipe and a second spraying pipe at high pressure, so that excess rainwater inside the buried pit can be quickly discharged, so that the charging pile can quickly return to the buried pit to avoid being damage caused by impact. Meanwhile rainwater sprayed quickly under high pressure has a wider coverage area, does not cause concentrated damage to the green plant area, and can make excess rainwater fully utilized and good drainage.

BRIEF DESCRIPTION OF THE SEVERAL VIEWS OF THE DRAWINGS

Further characteristics and advantages of the invention will emerge from the description of preferred, but not exclusive embodiments of an underground charging pile for new energy vehicle according to the invention, non-limiting examples of which are provided in the attached drawings, in which.

LIST OF REFERENCE CHARACTERS

| | |
|---|---|
| 1. green plant area; | 2. buried pit; |
| 3. charging pile; | 4. lifting rod; |
| 5. supporting plate; | 6. corrugated pipe; |
| 7. cover plate; | 8. water storage tank; |
| 9. propulsion spring; | 10. push plate; |
| 11. reserved box; | 12. second spraying pipe; |
| 13. second conveying pipe; | 14. first spraying pipe; |
| 15. first conveying pipe; | 16. pushing groove; |
| 17. driving plate; | 18. extrusion plate; |
| 19. connecting spring; | 20. spraying groove; |
| 21. water supply pipe; | 22. limiting spring; |
| 23. sliding block; | 24. nozzle; |
| 28. first pipe portion; | 29. second pipe portion; |
| 30. output portion; | 31. gap; |
| 81. first water storage tank; | 82. second water storage tank; |
| 91. first propulsion spring; | 92. second propulsion spring; |
| 101. first push plate; | 102. second push plate; |
| 111. first reserved box; | 112. second reserved box; |
| 161. first pushing groove; | 162. second pushing groove; |
| 171. first driving plate; | 172. second driving plate; |
| 181. first extrusion plate; | 182. second extrusion plate; |
| 191. first connecting spring; | 192. second connecting spring; |
| 241. first nozzle; | 242. second nozzle; |
| 231. first column portion; | 232. second column portion; |
| 233. groove; | 251. first check valve; |
| 252. second check valve; | 253. thrid check valve; |
| 254. fourth check valve; | 255. fifth check valve; |
| 256. sixth check valve. | |

DETAILED DESCRIPTION OF THE INVENTION

Embodiment 1

Figure 1:
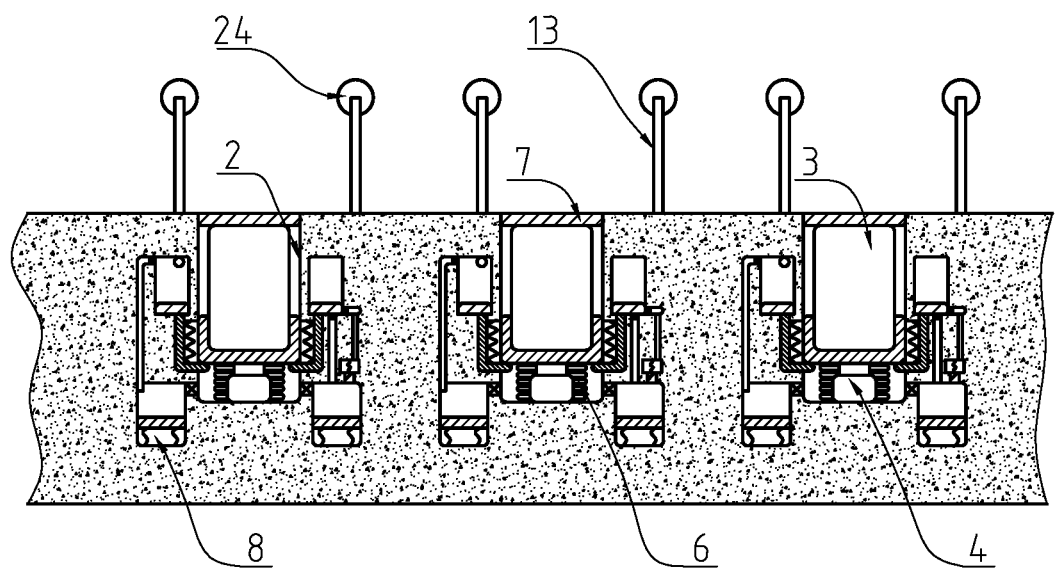
FIG. 1 is a structure drawing of an underground charging pile for new energy vehicle in embodiment 1.
Figure 2:
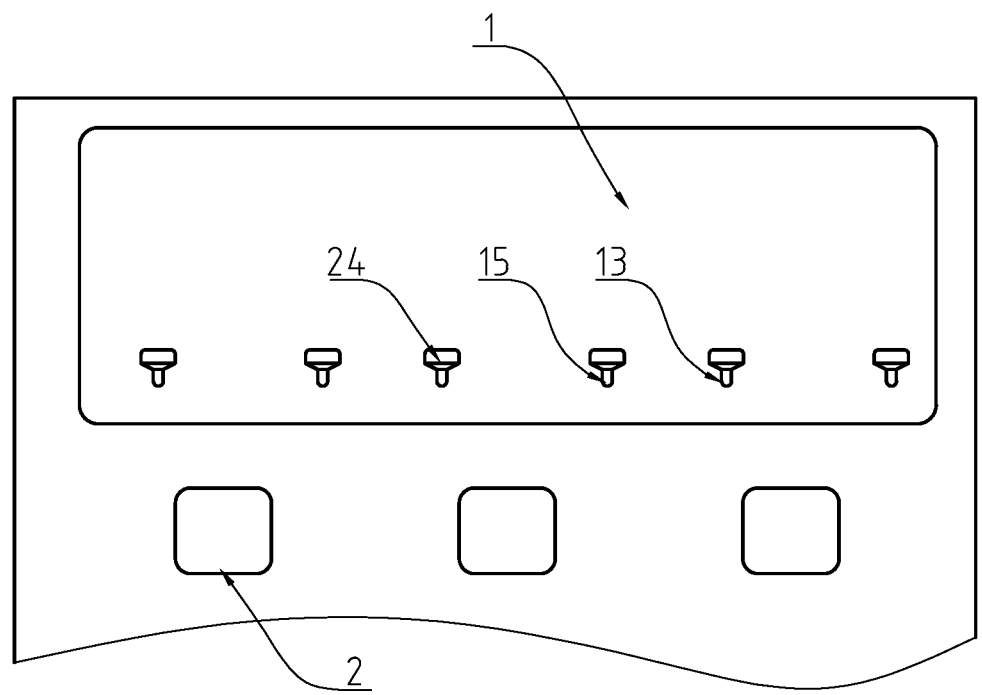
FIG. 2 is a top view of the underground charging pile for new energy vehicle in embodiment 1.
Figure 3:
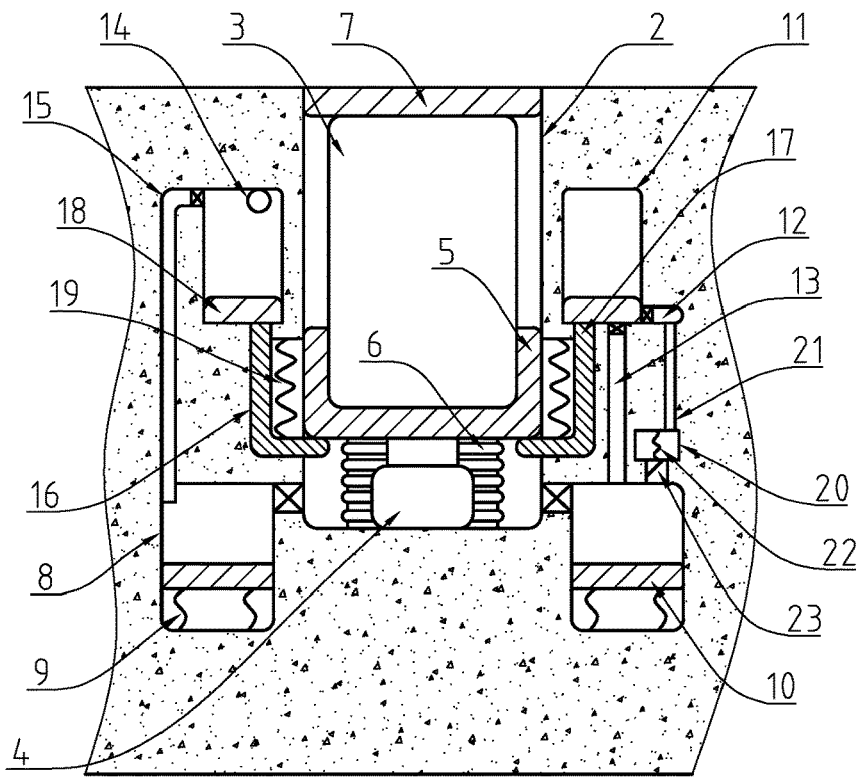
FIG. 3 is a structure drawing of a single one charging pile of the underground charging pile for new energy vehicle in embodiment 1.
Figure 4:
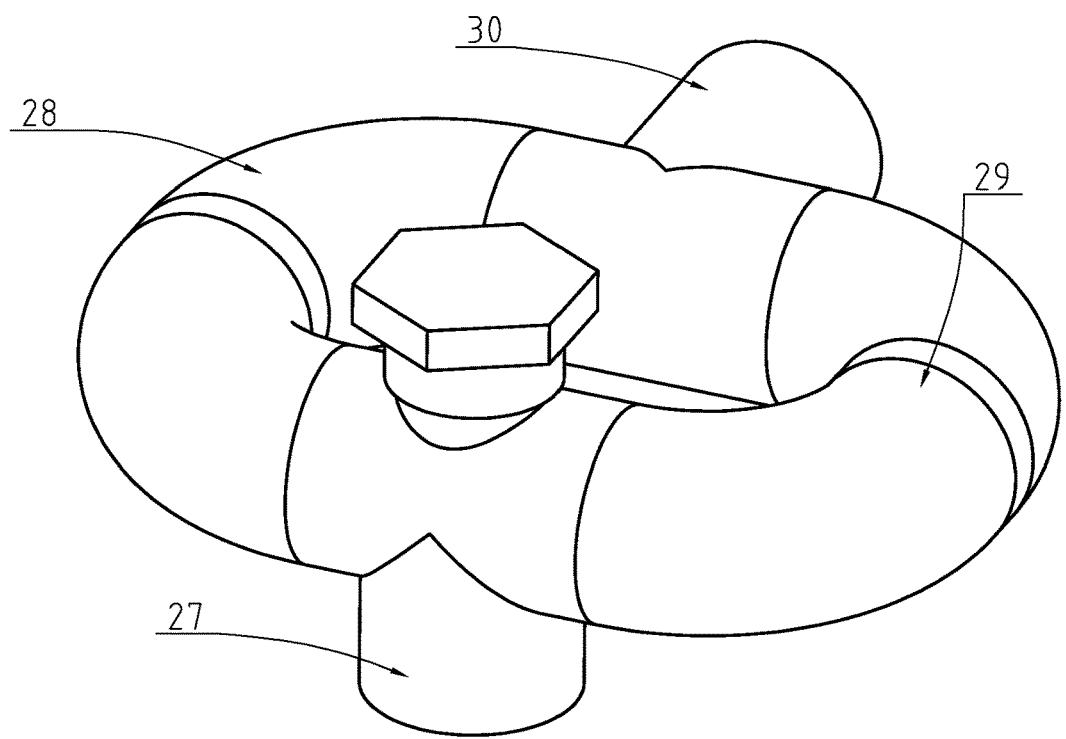
FIG. 4 is a 3d-drawing of a spraying groove in embodiment 2.

Referring to FIGS. 1-3, an underground charging pile for new energy vehicle comprises a green plant area 1 arranged on ground, a plurality of buried pits 2, and a plurality of charging piles 3. Each one of the plurality of buried pits 2 has a water storage device inside, the water storage device comprises two water storage tanks 8, each one of the water storage tanks 8 is communicated with inside of the buried pit 2, the water storage tanks 8 are set underground and arranged at two sides of the buried pit 2. A group of propulsion springs 9 are fixed to each inner bottom of the two water storage tanks 8, upper ends of the two propulsion springs 9 are fixedly provided with a pushing plate 10 which is in sealing and sliding connection with an inner wall of the corresponding water storage tank 8, an upper end of the charging pile 3 is fixedly provided with a cover plate 7 which is in sealing and sliding connection with an inner wall of the buried pit 2, a bottom of the charging pile 3 is fixedly provided with a supporting plate 5 which is in sealing and sliding connection with the inner wall of the buried pit 2. A lifting rod 4 and a corrugated pipe 6 are fixed between a lower of the supporting plate 5 and a lower of the buried pit 2, the lifting rod 4 is arranged inside the corrugated pipe 6, an extension of the lifting rod 4 drives the supporting plate 5 to move, so that the corrugated pipe 6 extends accordingly, thereby effectively protecting the lifting rod 4, so that the lifting rod 4 cannot be immersed by rainwater, at the same time, it does not corrode electrical lines. Both side walls of the buried pit 2 are equipped with water spraying devices.

The water spraying device comprises two reserved boxes 11 set underground and located at two sides of the buried pit 2. An upper end of a first reserved boxes 111 is provided with a first spraying pipe 14 and a first conveying pipe 15, a lower end of the first conveying pipe 15 is communicated with inside of a first water storage tanks 81, a lower end of a second water reserved box 112 is provided with a second spraying pipe 12 and a second conveying pipe 13, the second conveying pipe 13 is communicated with inside of a second water storage tanks 82. A check valve is arranged to each connecting part between the first spraying pipe 14 or the second spraying pipe 12 and corresponding reserved box 11, flow direction is from the corresponding reserved box 11 to the first spraying pipe 14 or the second spraying pipe 12. Another check valve is arranged to a connecting part between the first conveying pipe 15 or the second conveying pipe 13 and the reserved box 11, flow direction is from the conveying pipe 15 or the second conveying pipe 13 to the corresponding reserved box 11. Another check valve is arranged to connecting part between two water storage tanks 8 and the buried pit 2, flow direction is from the buried pit 2 to inside of the water storage tank 8.

A nozzle 24 is fixedly arranged to an upper end of the first spraying pipe 14 and an upper end of the second spraying pipe 12, two pushing grooves 16 are arranged to the buried pit 2 corresponding to the two reserved boxes 11, a driving structure is provided to inside of each one of the two pushing grooves 16. The driving structure has a connecting spring 19 fixed to an inner wall of an upper end of the pushing grooves 16, an lower end of the connecting spring 19 is fixedly provided with a driving plate 17, an upper end of the driving plate 17 penetrates through the corresponding reserved boxes 11 and is fixedly provided with an extrusion plate 18 which is in sealing and sliding connection with an inner wall of the corresponding reserved boxes 11.

An inner wall of an upper end of the water storage tank 8 communicated with the second conveying pipe 13 is provided with a spraying groove 20, an inner wall of an upper end of the spraying groove 20 is fixedly provided with a limiting spring 22, a bottom of the limiting spring 22 is fixedly provided with a sliding block 23 which is in sealing and sliding connection with the inner wall of the spraying groove 20, the upper end of the spraying groove 20 is provided with a water supply pipe 21 communicated with the second spraying pipe 12. The spraying groove 20 has a T-shaped structure, an lower portion of the spraying groove 20 is blocked by the sliding block 23, after the sliding block 23 slides a certain distance into the spraying groove 20, a large gap appears between the sliding block 23 and an inner wall of the spraying groove 20, so that the water storage tank 8 communicates with the spraying groove 20. Since a stiffness coefficient of the limit spring 22 is much greater than that of the propulsion spring 9, rainwater cannot enter the spraying groove 20 under normal circumstances, ensuring an effective storage of rainwater.

When the charging pile 3 needs to be used for charging, first start the lifting rod 4 to extend the lifting rod 4 and push the charging pile 3 out of the buried pit 2, so that the charging pile 3 is raised to the ground for charging. After charging is completed, the lifting rod 4 shrinks and lowers to drive the charging pile 3 back to the buried pit 2, effectively avoiding loss caused by long-term exposure of the charging pile 3, and at the same time avoiding the charging pile 3 from being damaged by collision of vehicles, making the charging pile 3 safer in service life longer.

When the charging pile 3 rises to the ground to supply power, rainwater is able to enter the buried pit 2. When the charging pile 3 returns to the buried pit 2, the supporting plate 5 squeezes rainwater that enters the buried pit 2, so that rainwater enters the water storage tank 8 under the squeeze. Increase of rainwater in the water storage tank 8 causes the supporting plate 5 to move downward under pressure and causes the propulsion spring 9 to contract.

Downward movement of the charging pile 3 causes the supporting plate 5 to push the driving plate 17 to move downward, thereby causing the extrusion plate 18 to move down synchronously, resulting in an increase in upper space of the reserved box 11 and a decrease in lower space. Rainwater inside the water storage tank 8 is pushed by the push plate 10 to enter an upper part of the corresponding reserved box 11 through the first conveying pipe 15 to realize a pre-storage of rainwater.

When the charging pile 3 moves up again, the driving plate 17 is reset under elastic force of the connecting spring 19, and then the extrusion plate 18 is driven to move upward, so that upper space of the reserved box 11 is compressed and lower space of the reserved box 11 is increased. In this state, rainwater originally stored in the reserved box 11 is pushed by the extrusion plate 18 so that rainwater inside is sprayed out through the first spraying pipe 14 to realize a watering of the green plant area 1. Because bottom space of another reserved box 11 without water storage increases, rainwater inside the water storage tank 8 enters the bottom space of the reserved box 11 through the second conveying pipe 13. When the charging pile 3 moves down again, the extrusion plate 18 squeezes rainwater, so that rainwater is sprayed out through the second spraying pipe 12 to realize re-watering of the green plant area 1.

When the charging pile 3 moves up, the first spraying pipe 14 is used for watering first, and the reserved box 11 connected with the second spraying pipe 12 reserves rainwater. When the charging pile 3 moves down, the second spraying pipe 12 is sprayed for watering, and the reserved box 11 connected with the first spraying pipe 14 reserves rainwater, so that the charging pile 3 completes charging process once and waters the green area 1 twice.

Moreover, for office workers with a general life pattern, vehicles are generally used during the day and is charged at night, and vehicles cannot be charged until the next morning. Therefore, watering time of the green plant area 1 is basically fixed at all times, both in the morning and at night, which fully matches watering time of green plants. This enables green plants in the green plant area 1 to be effectively watered, reduces a cost of manpower watering, and at the same time utilizes rainwater. Erosion of the charging pile 3 by rainwater is avoided, and service life of the charging pile 3 is increased.

In a case of continuous heavy rainfall, it may happen that the water storage tank 8 is full of water and there is still water in the buried pit 2. In this state, the lifting rod 4 drives the supporting plate 5 to move downward to squeeze rainwater, so that pressure inside the water storage tank 8 gradually increases, and finally the sliding block 23 compresses the limit spring 22 under the pressure. The sliding block 23 moves to inside of the spraying groove 20, so that the water storage tank 8 is connected to the water supply pipe 21 through the spraying groove 20, and excess rainwater enters the second spraying pipe 12 through the water supply pipe 21 and is sprayed out. At the same time, excess rainwater inside the water storage tank 8 enters a corresponding reserved box 11 through the first conveying pipe 15. As water pressure increases, rainwater is sprayed from the first spraying pipe 14.

It can be seen that when continuous heavy rainfall occurs, excess rainwater inside the buried pit 2 is directly sprayed out. And because there is more rain, water pressure is higher, so a spray coverage is wider, and it does not be concentrated in a small area, and thus does not cause damage to the green area 1. A synchronous spraying of the first spraying pipe 14 and the second spraying pipe 12 can quickly drain the excess rainwater, so that the charging pile 3 can still quickly return to the buried pit 2 to avoid an occurrence of accidents caused by staying on the ground for a long time after charging is completed, the charging pile 3 is effectively protected.

Embodiment 2

Figure 5:
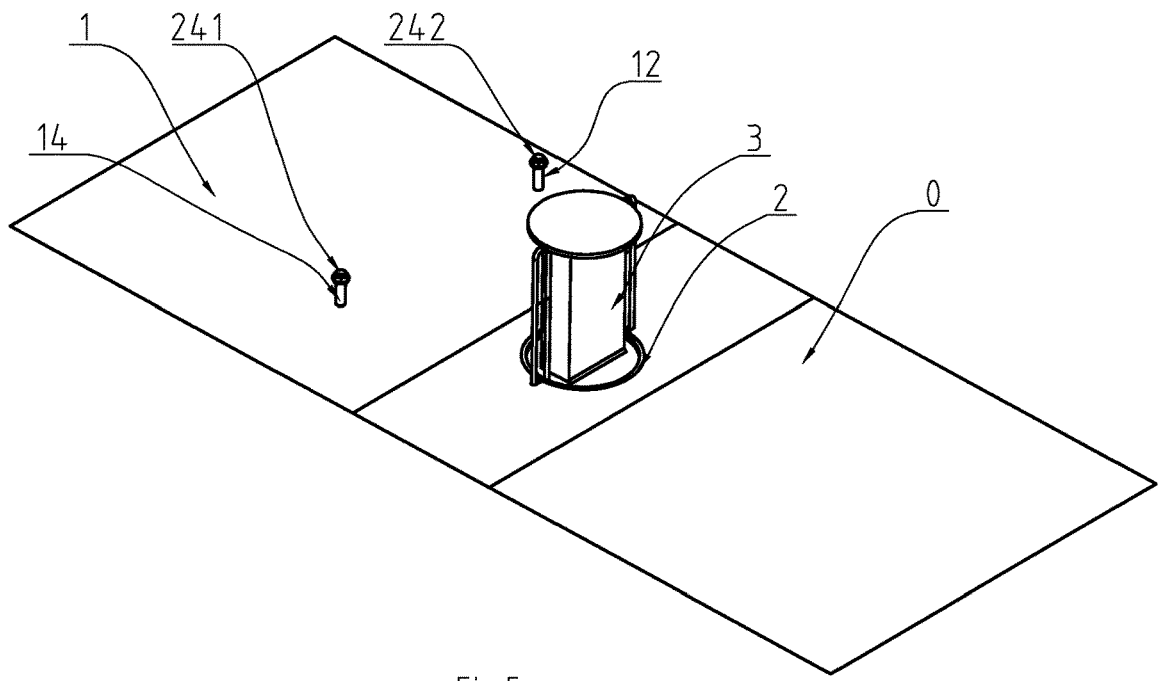
FIG. 5 is a schematic drawing of an underground charging pile for new energy vehicle in embodiment 2, wherein a charging pile is in an extended state.
Figure 6:
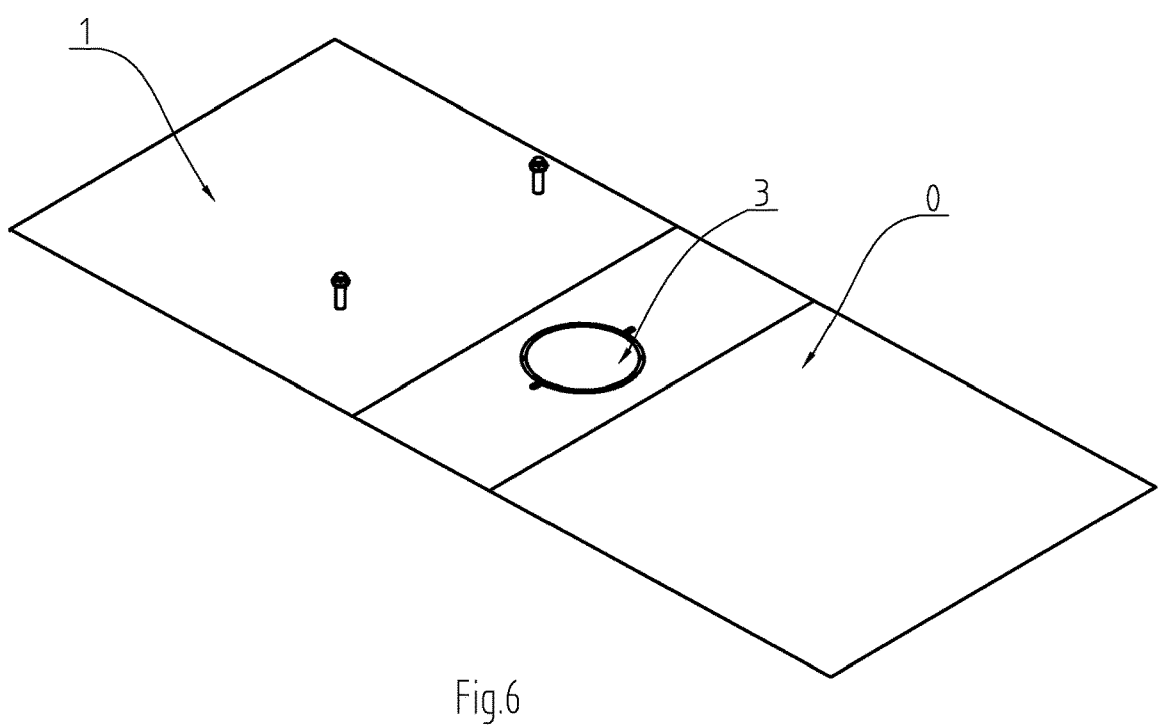
FIG. 6 is a schematic drawing of the underground charging pile for new energy vehicle in embodiment 2, wherein the charging pile is hidden.

Referring to FIG. 5, this embodiment discloses an underground charging pile for new energy vehicle, the underground charging pile comprises a parking area 0, a green plant area 1, a buried pit 2 and a charging pile 3. The charging pile 3 is arranged between the parking area 0 and the green plant area 1. When charging a new energy vehicle parked in the parking area 0, the charging pile 3 extends out of the buried pit 2. The charging pile 3 retracts into the buried pit 2 when it is not charging, as shown in FIG. 6.

Figure 9:
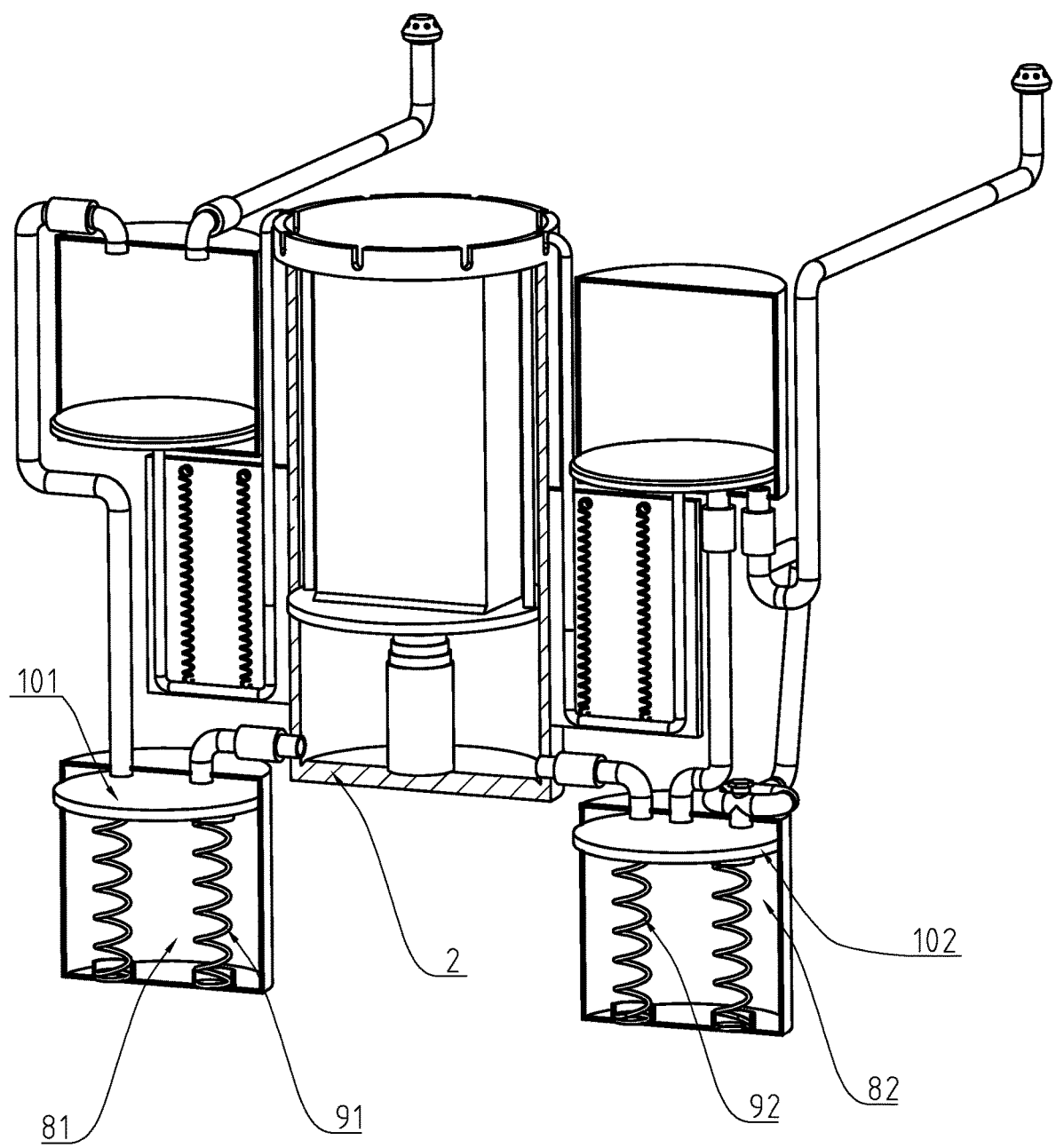
FIG. 9 is a sectional 3d-drawing of FIG. 7.

Referring to FIG. 9, the buried pit 2 has a water storage device, the water storage device has two water storage tanks 8 communicated with inside of the buried pit 2, the water storage tank 8 comprises a first water storage tank 81 and a second water storage tank 82. The first water storage tank 81 and the second water storage tank 82 are set underground and locate at two sides of the buried pit 2. A first propulsion spring 91 is arranged to an inner bottom of the first water storage tank 81, a second propulsion spring 92 is arranged to an inner bottom of the second water storage tank 82. The first water storage tank 81 has a first push plate 101 which is in sealing and sliding connection with an inner wall of the first water storage tank 81, the second water storage tank 82 has a second push plate 102 which is in sealing and sliding connection with an inner wall of the second water storage tank 82, an upper end of the first propulsion spring 91 is matched with the first push plate 101, and an upper end of the second propulsion spring 92 is matched with the second push plate 102.

Figure 11:
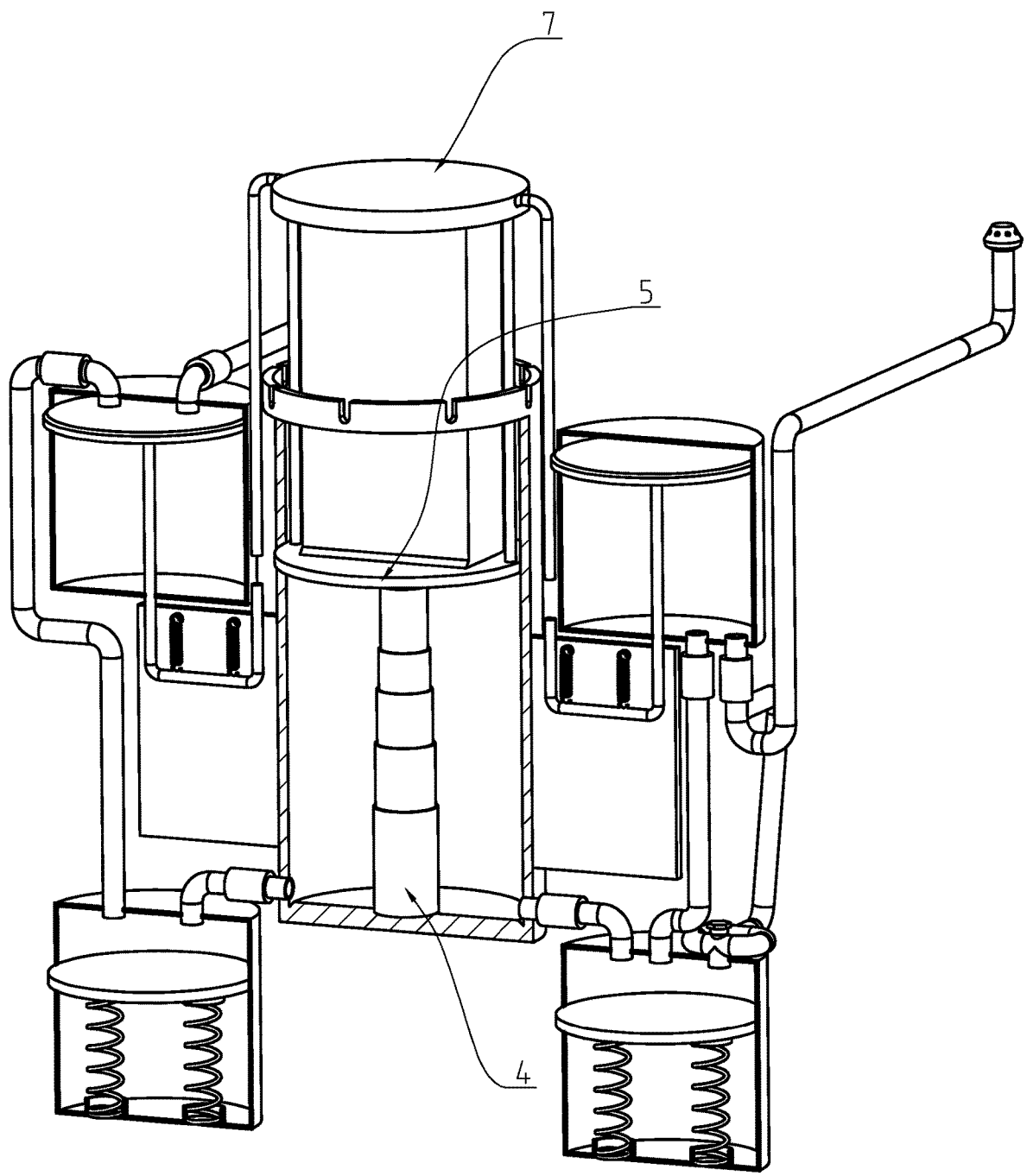
FIG. 11 to FIG. 13 are sectional 3d-drawings of process of moving a charging pile down to a buried pit.

Referring to FIG. 11, an upper end of the charging pile 3 is fixed with a cover plate 7 which is in sealing and sliding connection with an inner wall of the buried pit 2, a bottom of the charging pile 3 is fixed with a supporting plate 5 which is in sealing and sliding connection with an inner wall of the buried pit 2, a bottom of the supporting plate 5 and a bottom of the buried pit 2 are fixed with a lifting rod 4, both side walls of the buried pit 2 are equipped with water spraying devices.

Figure 7:
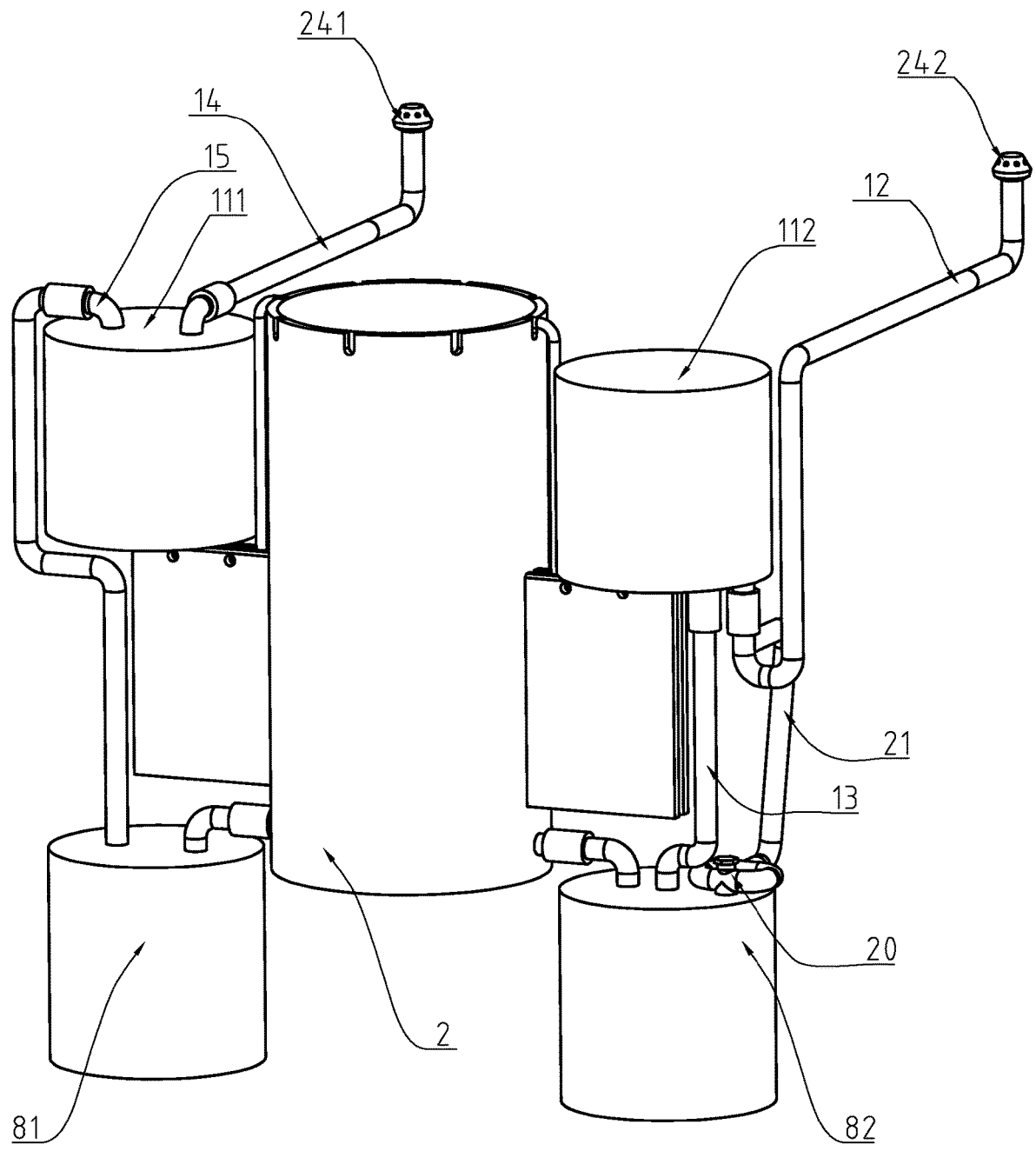
FIG. 7 is a 3d-drawing of a charging pile in embodiment 2, wherein the charging pile is hidden.
Figure 8:
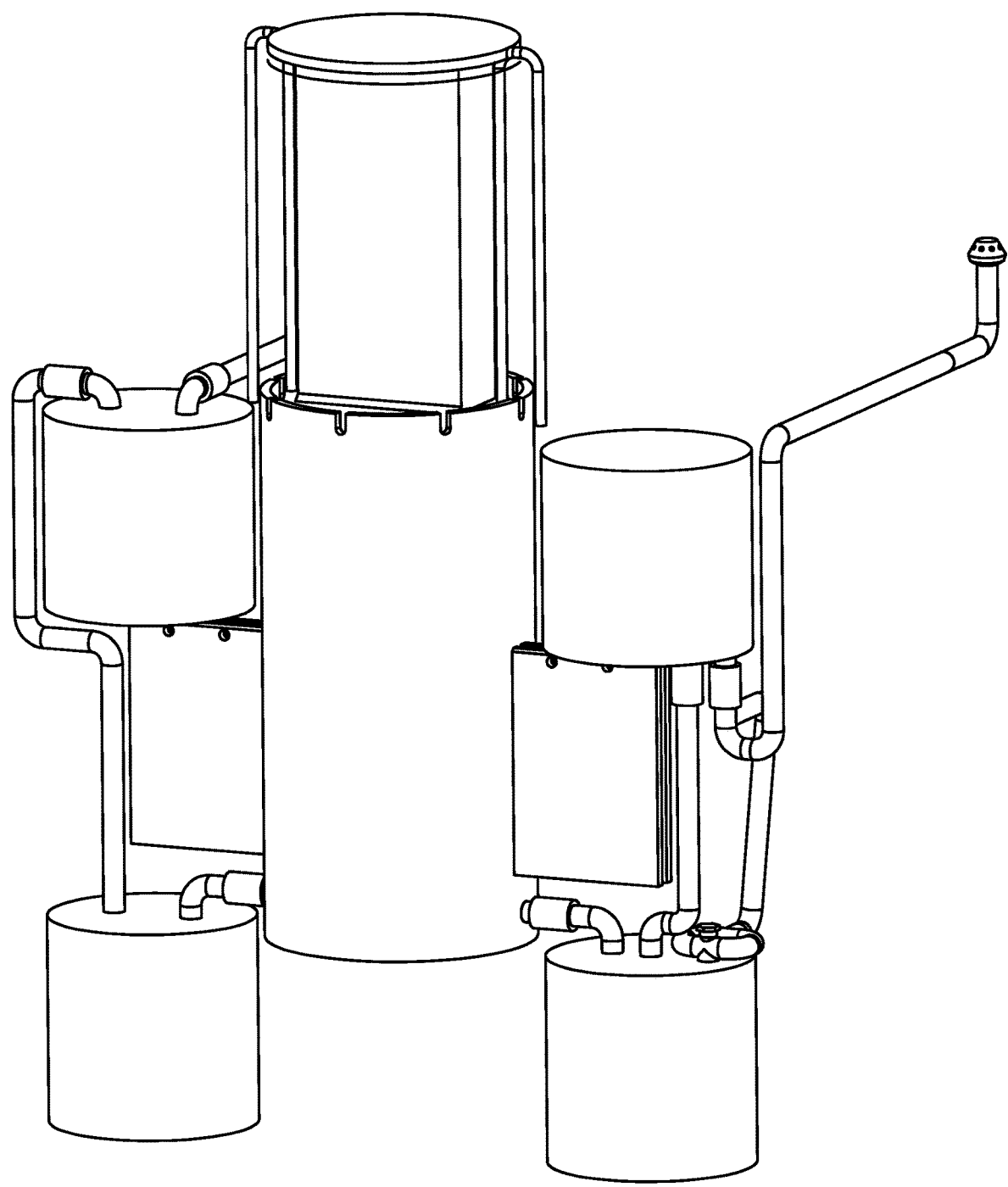
FIG. 8 is a 3d-drawing of a charging pile in FIG. 7, wherein the charging pile is in an extended state.

Referring to FIG. 7, the water spraying device has two reserved box, one is a first reserved box 111, another one is a second reserved box 112, the first reserved box 111 and the second reserved box 112 are arranged underground and located at two sides of the buried pit 2. A first spraying pipe 14 and a first conveying pipe 15 are arranged to an upper end of the first reserved box 111, a lower end of the first conveying pipe 15 is communicated with inside of the first water storage tank 81. A second spraying pipe 12 and a second conveying pipe 13 are arranged to an lower end of the second reserved box 112, an upper end of the second conveying pipe 13 is communicated with inside of the second water storage tank 82. An upper end of the first spraying pipe 14 is fixed with a first nozzle 241, an upper end of the second spraying pipe 12 is fixed with a second nozzle 242.

Figure 10:
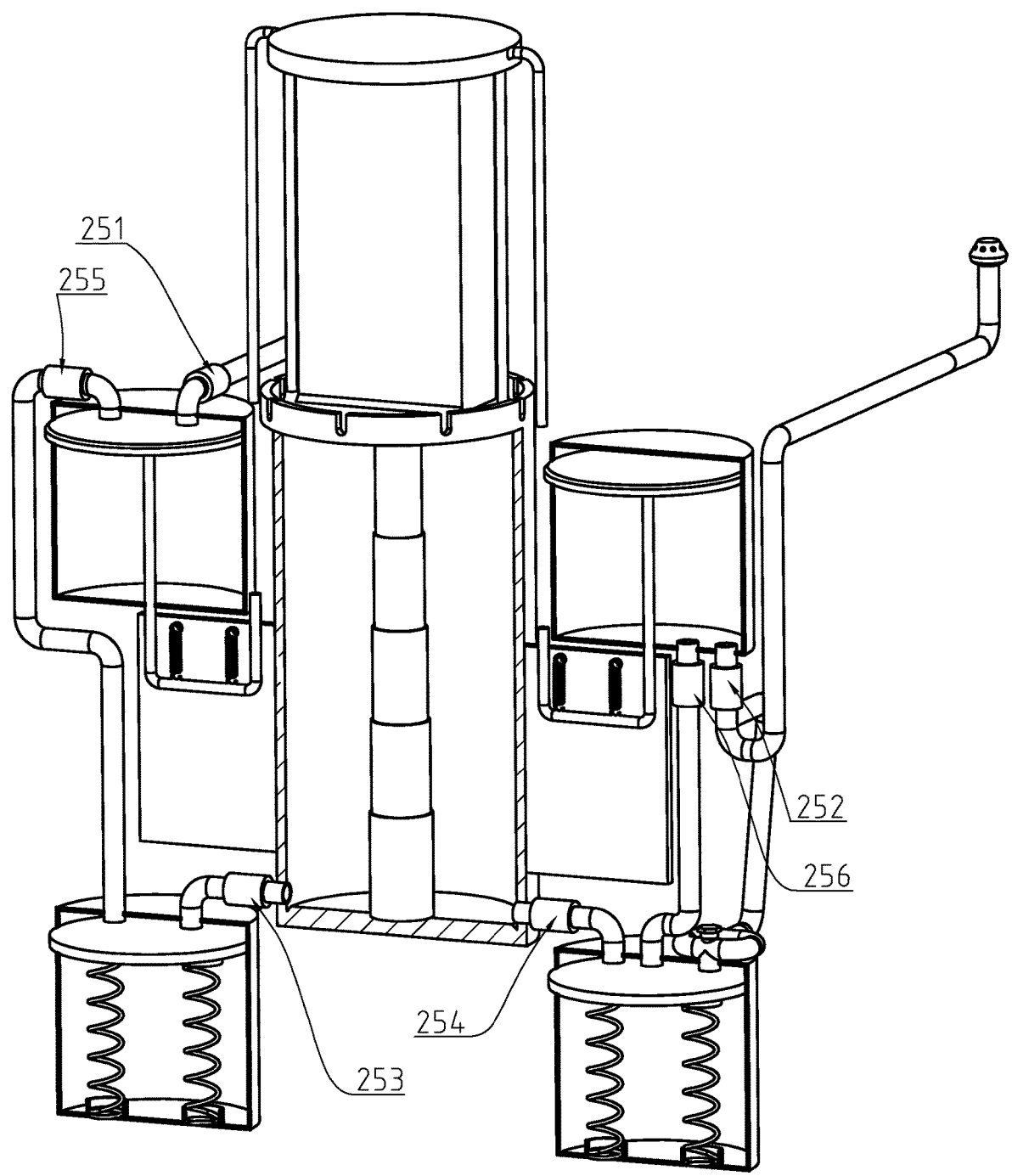
FIG. 10 is a sectional 3d-drawing of FIG. 8.

Referring to FIG. 10, a first check valve 251 is provided at a connection between the first spraying pipe 14 and the first reserved box 111, flow direction of the first check valve 251 is from the first reserved box 111 to the first spraying pipe 14. A second check valve 252 is provided at a connection between the second spraying pipe 15 and the second reserved box 112, flow direction of the second check valve 252 is from the second reserved box 112 to the second spraying pipe 15. A third check valve 253 is provided at a connection between the first water storage tank 81 and the buried pit 2, flow direction of the third check valve 253 is from the buried pit 2 to the first water storage tank 81. A fourth check valve 254 is provided at a connection between the second water storage tank 82 and the buried pit 2, flow direction of the fourth check valve 254 is from the buried pit 2 to the second water storage tank 82. A fifth check valve 255 is provided at a connection between the first reserved box 111 and the first spraying pipe 15, flow direction of the fifth check valve 255 is from the first spraying pipe 15 to the first reserved box 111. A sixth check valve 256 is provided at a connection between the second reserved box 112 and the second spraying pipe 13, flow direction of the sixth check valve 256 is from the second spraying pipe 13 to the second reserved box 112.

Figure 12:
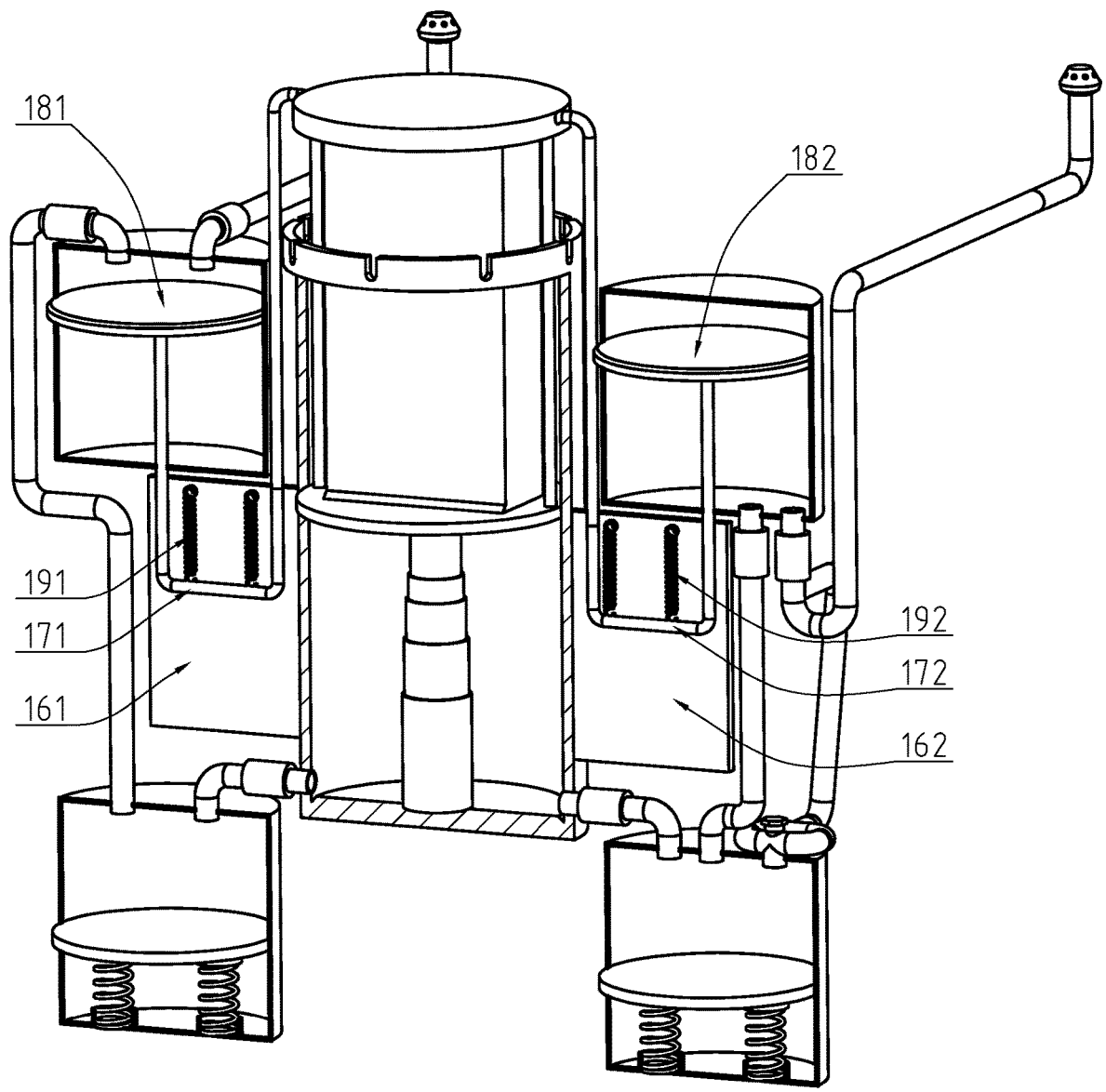
Figure 21:
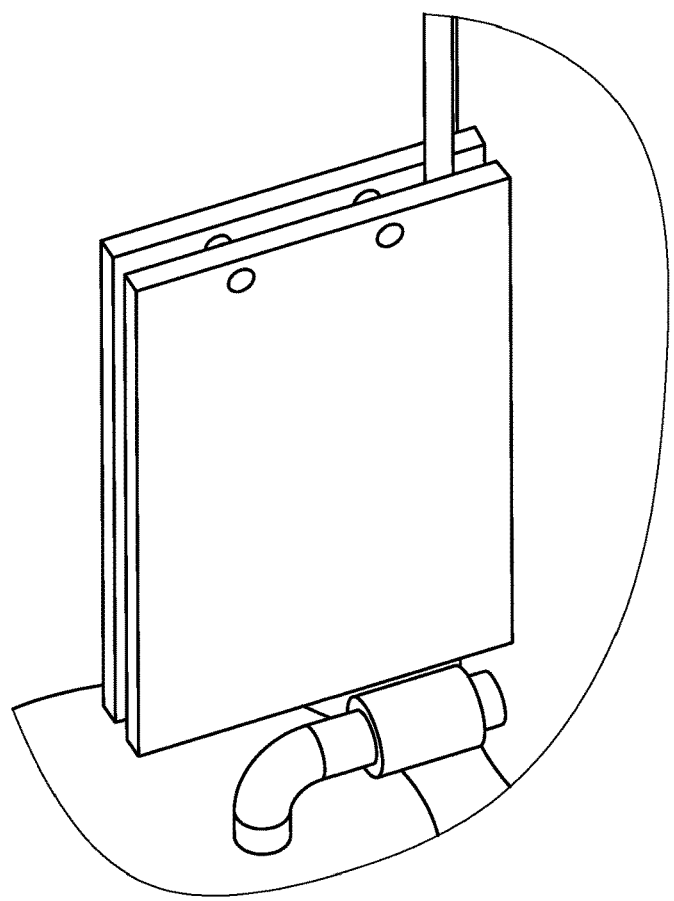
FIG. 21 is a sectional 3d-drawing of a pushing groove.

Referring to FIG. 12, two pushing grooves are arranged to the buried pit 2, the buried pit 2 is provided with two pushing grooves, and the two pushing grooves correspond to two reserved boxes one by one. The pushing groove is composed of two parallel and spaced plates, as shown in FIG. 21. A first pushing groove 161 corresponds to the first reserved box 111, a second pushing groove 162 corresponds to the second reserved box 112. A first driving structure is arranged inside the first pushing groove 161, a second driving structure is arranged inside the second pushing groove 162. The first driving structure has a first connecting spring 191 fixed on an inner wall of an upper end of the first pushing groove 161, a first driving plate 171 is fixed at a lower end of the first connecting spring 191, an upper end of the first driving plate 171 penetrates into inside of the first reserved box 111 and is fixedly provided with a first extrusion plate 181 which is in sealing and sliding connection with an inner wall of the first reserved box 111. The second driving structure has a second connecting spring 192 fixed on an inner wall of an upper end of the second pushing groove 162, a second driving plate 172 is fixed at a lower end of the second connecting spring 192, an upper end of the second driving plate 172 penetrates into inside of the second reserved box 112 and is fixedly provided with a second extrusion plate 182 which is in sealing and sliding connection with an inner wall of the second reserved box 112.

Referring to FIG. 7, a spraying groove 20 is provided on an inner wall of an upper end of the second water storage tank 82 communicated with the second conveying pipe 13, an inner wall of an upper end of the spraying groove 20 is fixed with a limit spring 22, a bottom of the limit spring 22 is fixed with a sliding block 23 which is in sealing and sliding connection with an inner wall of the spraying groove 20, an upper end of the spraying groove 20 is provided with a water supply pipe 21 communicated with the second spraying pipe 12, the spraying groove 20 has a T-shaped structure.

Referring to FIG. 9, the sliding block 23 is provided with a first column section 231 and a second column section 232, the first column section 231 and the second column section 232 are coaxially arranged, both the first column second 231 and the second column section 232 seal and slide with an inner wall of the spraying groove 20. A groove 233 is coaxially formed between the first column section 231 and the second column section 232. The first column section 231 is provided with a through hole penetrating through the first column section 231, the through hole is communicated with the groove 233, the second column section 232 is matched with the limit spring 22.

Figure 17:
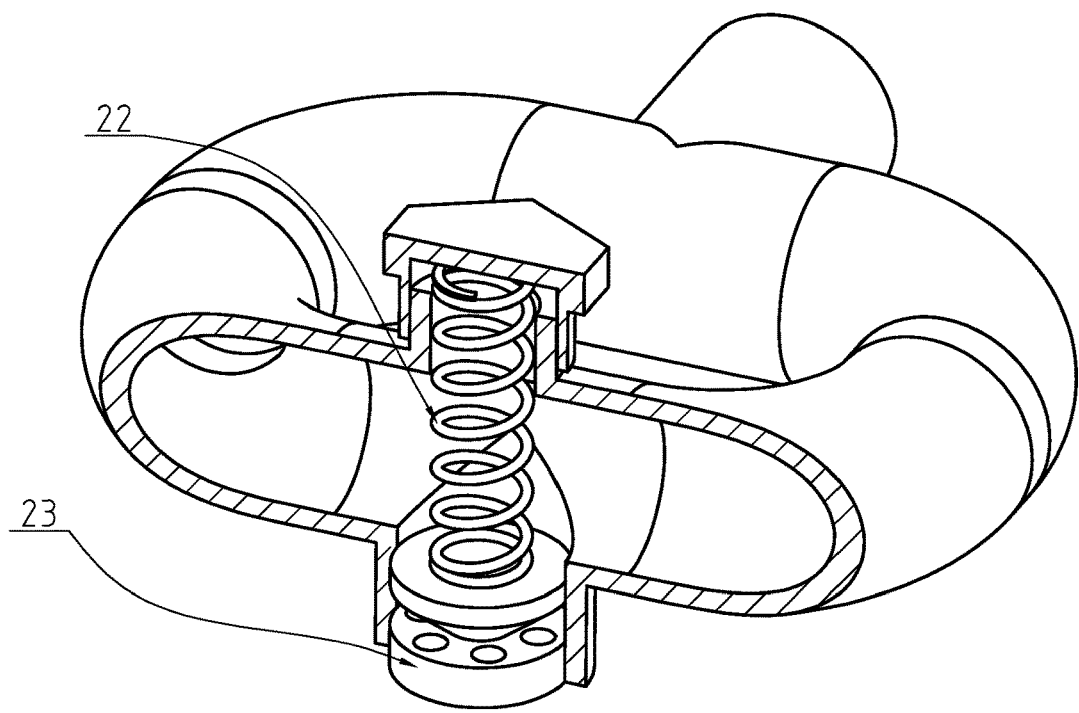
FIG. 17 is a partly sectional 3d-drawing of FIG. 4, wherein a sliding block is in a close state.

Referring to FIG. 17, since the second column section 232 of the sliding block 23 is in a sealing fit with an inner wall of the spraying groove 20, rainwater in the second water storage tank 82 enters the groove 233 through the through hole of the first column section 231 and is restricted in the groove 233, rainwater cannot flow out through the spraying groove 20.

Figure 18:
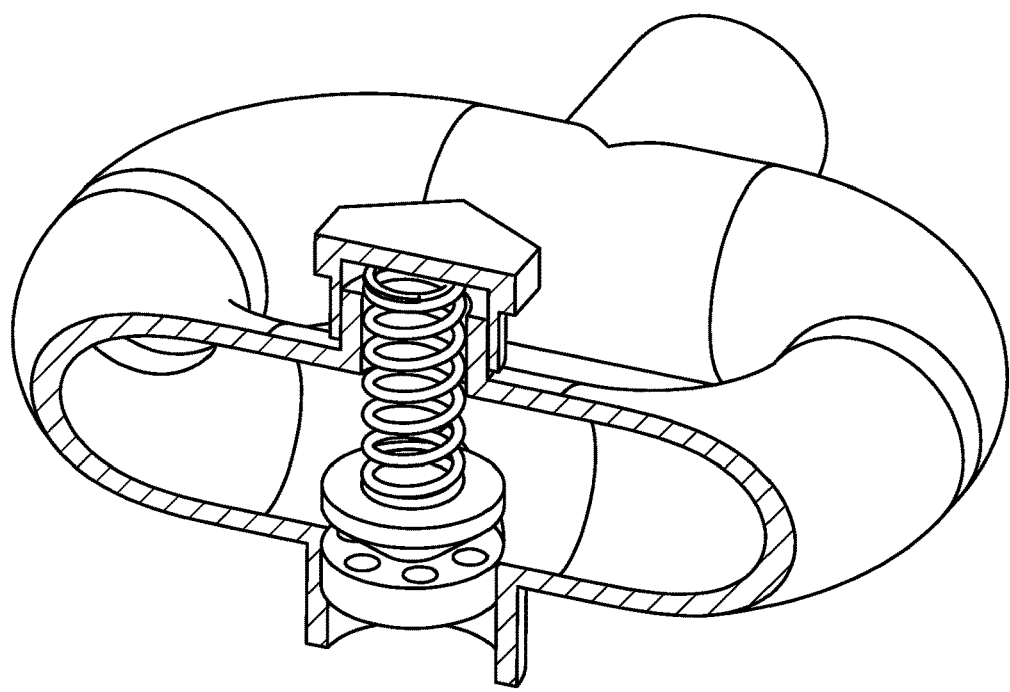
FIG. 18 is a partly sectional 3d-drawing of FIG. 4, wherein a sliding block is in a open state.
Figure 19:
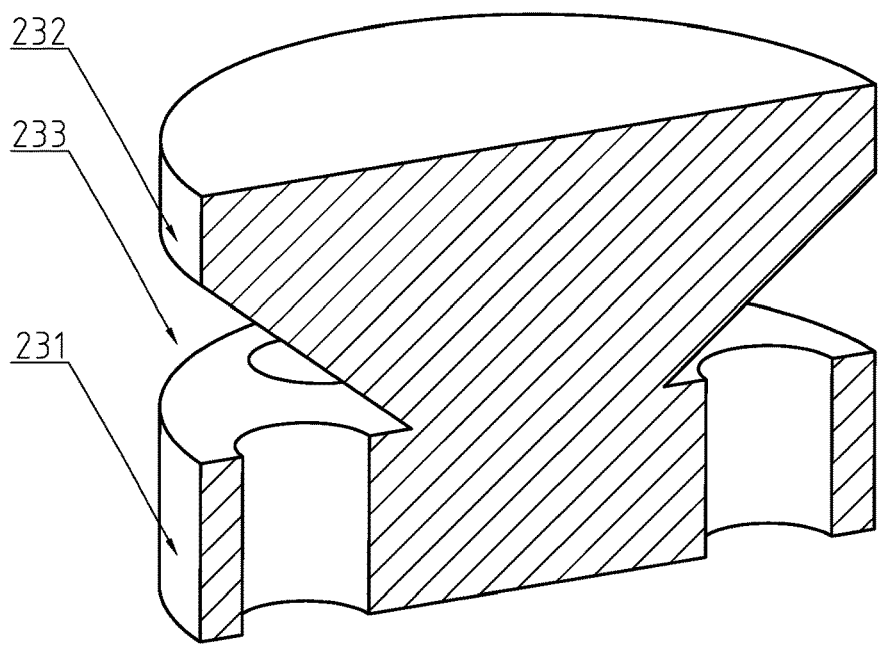
FIG. 19 is a sectional 3d-drawing of a sliding block.

Referring to FIG. 18, when water pressure in the second water storage tank 82 increases and overcomes elastic force of the limit spring 22, the sliding block 23 moves to inside of the spraying groove 20. When the second column section 232 moves out of an inner wall of the spraying groove 20, the groove 233 communicates with the spraying groove 20, so that the second water storage tank 82 communicates with the spraying groove 20.

Figures 22, 23:
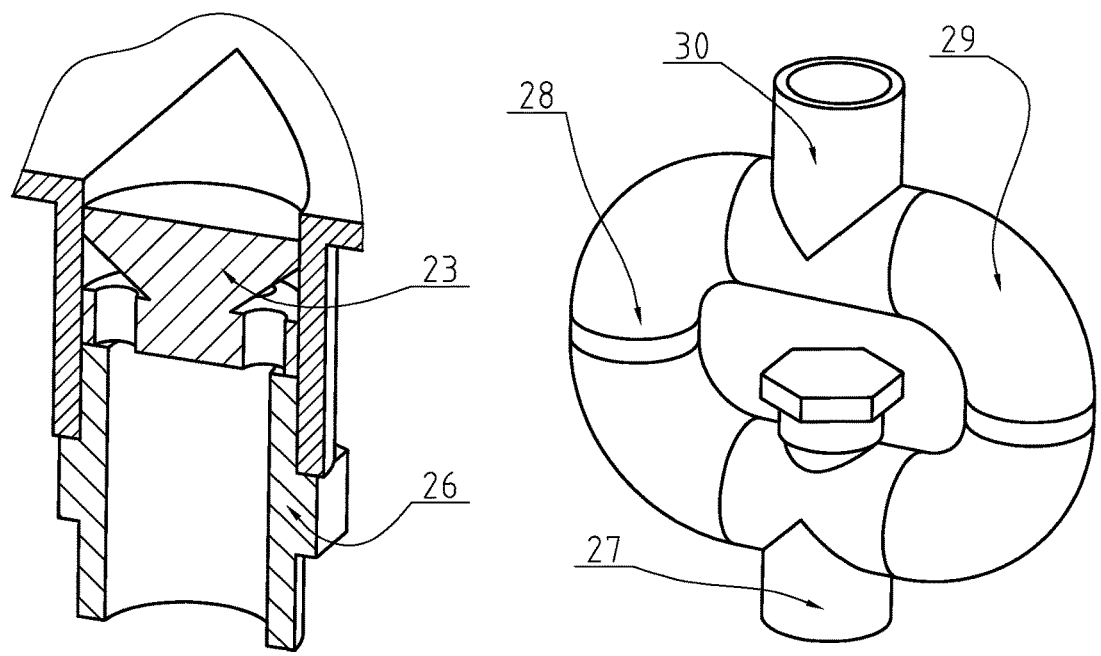
FIG. 22 is a sectional 3d-drawing of a sliding block and a limit ring in cooperation.
FIG. 23 is a 3d-drawing of a spraying groove.

Referring to FIG. 22, in order to prevent the sliding block 23 from moving out of the spraying groove 20 under elastic force of the limit spring 22, a casing pipe 26 is inserted at a bottom of the spraying groove 20, the casing pipe 26 is partly inserted into the spraying groove 20, and the sliding block 23 abuts against the casing pipe 26 under elastic force of the limit spring 22.

Referring to FIG. 23, the spraying groove 20 comprises a body 27, a first pipe portion 28, a second pipe portion 29, and an output portion 30. The body 27 has a T-shaped structure, the body 27 comprises the sliding block 23 which is in sealing and sliding connection with an inner wall of the body 27 and the limiting spring 22 matched with the sliding block 23. The first pipe portion 28 and the second pipe portion 29 are symmetrically arranged with respect to a central plane of the body 27, the output portion 30 communicates with the first pipe portion 28 and the second pipe portion 29, the body 27 communicates with the first pipe portion 28 and the second pipe portion 29, according to needs of the pipe arrangement on site, the output portion 30 of the spraying groove 20 can be set perpendicular to the body 27 or parallel to the body 27, as shown in FIG. 23.

In this embodiment, when the charging pile 3 needs to be used for charging, the lifting rod 4 is first activated to extend the lifting rod 4 to push the charging pile 3 out of the buried pit 2, the charging pile 3 rises to the ground for charging. After charging is completed, the lifting rod 4 shrinks and lowers to drive the charging pile 3 back to the buried pit 2, which effectively avoids loss of the charging pile 3 due to long-term exposure, and avoids the charging pile 3 from being damaged by vehicle collision. It is safer for the charging pile 3 to reach a longer service life.

Figure 20:
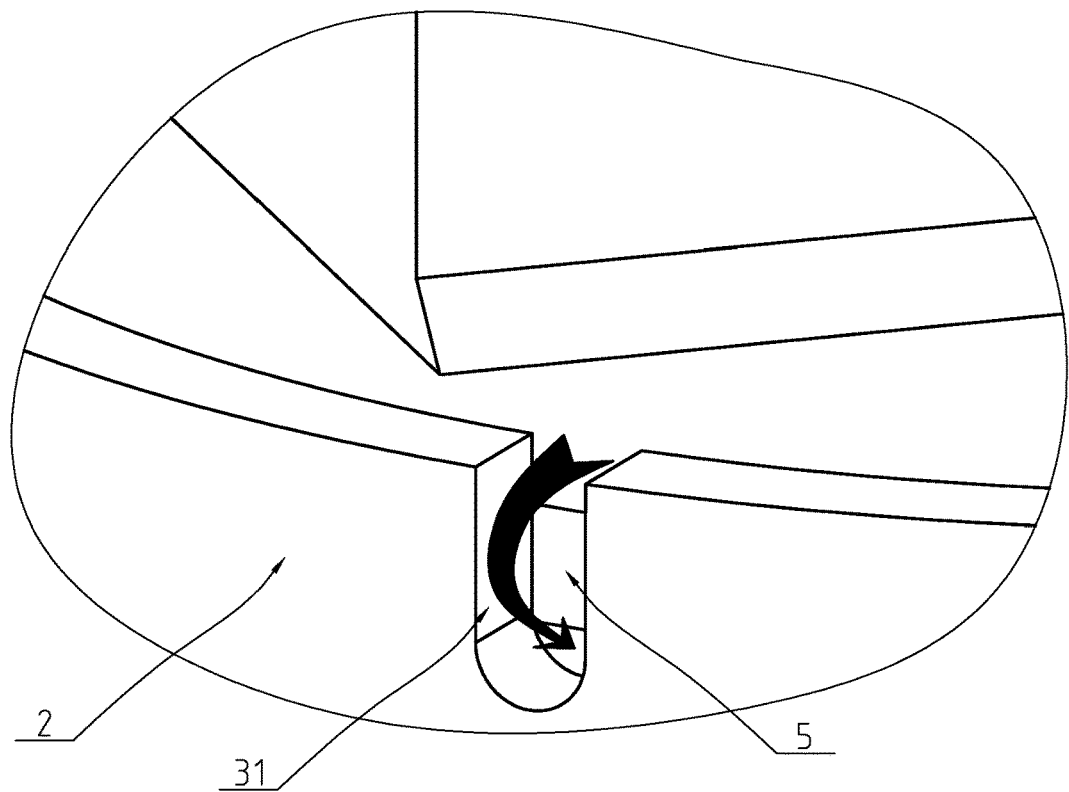
FIG. 20 is a schematic drawing of water on a supporting plate flowing into a buried pit through a gap.

Referring to FIG. 20, a gap 31 is provided at a junction of the buried pit 2 and the ground, the size of the gap 31 in direction of gravity is greater than a thickness of the supporting plate 5. When the charging pile 3 rises to the ground, there is a certain distance between the supporting plate 5 and a top of the gap 31. The supporting plate 5 is between a top and a bottom of the gap 31, so rainwater enters the buried pit 2 through space between the gap 31 and the supporting plate 5.

When the charging pile 3 rises to the ground to supply power, rainwater enters the buried pit 2, as shown in FIG. 10. When the charging pile 3 returns to the buried pit 2, the supporting plate 5 squeezes rainwater stored in the buried pit 2, so that rainwater enters the first water storage tank 81 and the second water storage tank 82 under pressure. As a result, rainwater inside the first water storage tank 81 and the second water storage tank 82 is increased in quality, which in turn causes the first push plate 101 and the second push plate 102 to move downward under pressure, and causes the first propulsion spring 91 and the second propulsion spring 92 to contract, as shown in FIG. 11.

Figure 13:
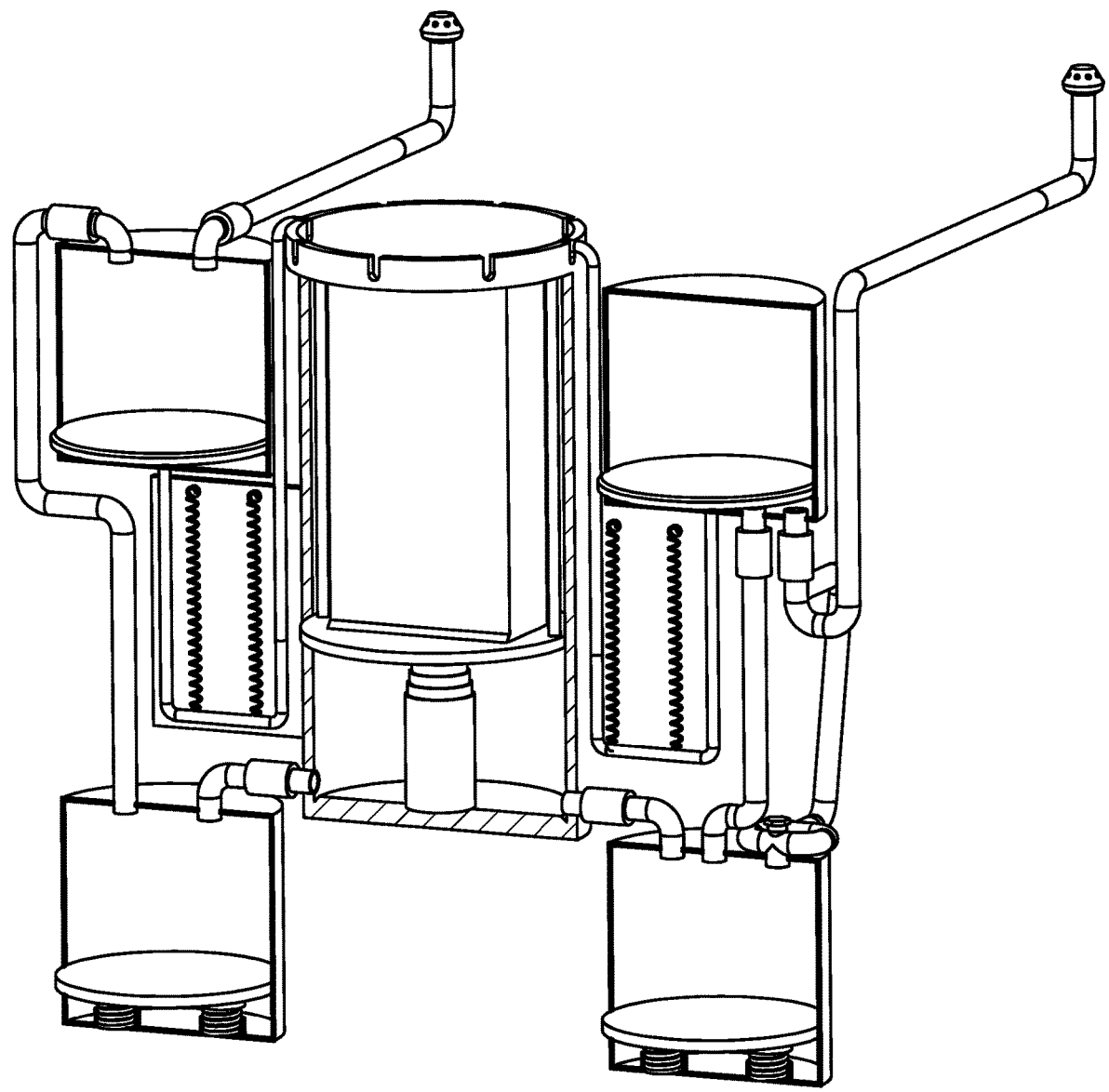

Downward movement of the charging pile 3 causes the supporting plate 5 to push the first driving plate 171 downward, causing the first extrusion plate 181 to move downward synchronously, so that upper space of the first reserved box 111 is increased while lower space is reduced. Rainwater inside the first water storage tank 801 is pushed by the first push plate 101 to enter an upper part of the first reserved tank 111 through the first conveying pipe 15, so as to realize a pre-storage of rainwater by the first reserved tank 111. Similarly, downward movement of the charging pile 3 causes the supporting plate 5 to push the second driving plate 172 downward, causing the second extrusion plate 182 to move down synchronously, so that upper space of the second reserved box 112 increases while lower space decreases. The first conveying pipe 15 is arranged at a lower part of the second reserved box 112, so that rainwater in the second water storage tank 82 cannot enter the second reserved box 112 during downward movement of the second driving plate 172, as shown in FIG. 12 and FIG. 13.

Figure 14:
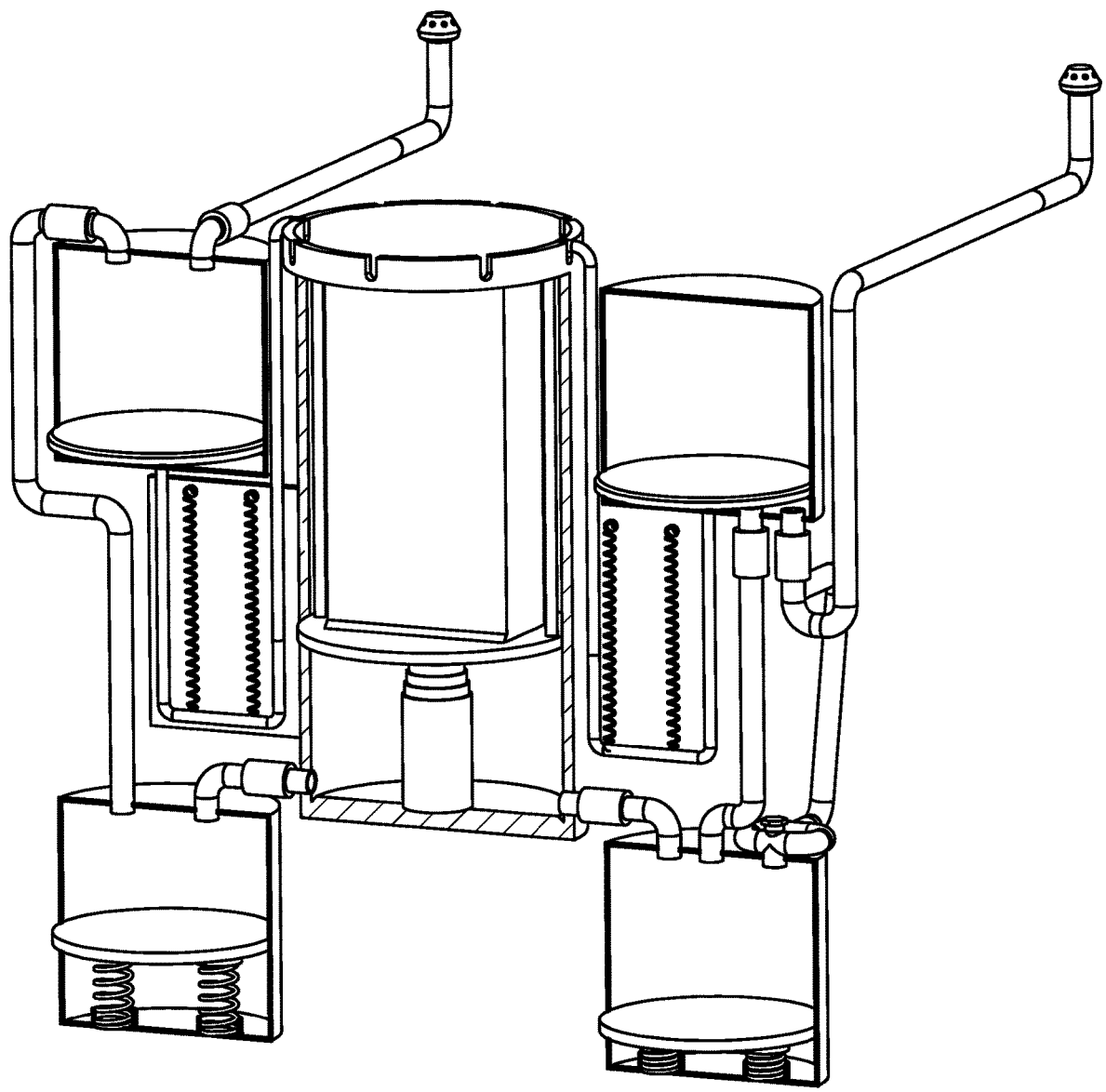
FIG. 14 to FIG. 15 are sectional 3d-drawings of process in which a water storage device presses water into a water spraying device.
Figure 15:
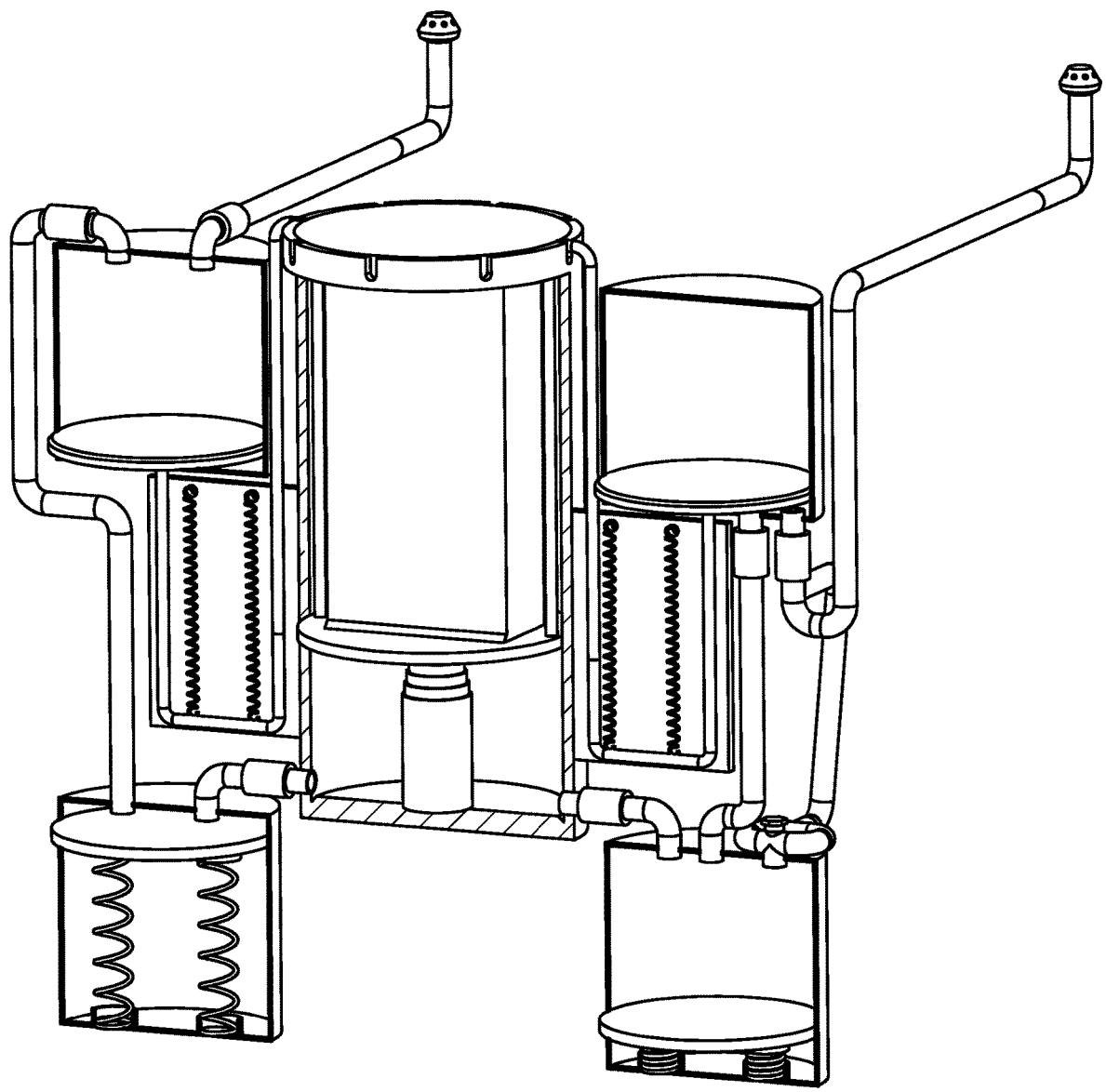

Referring to FIG. 14 and FIG. 15, when the charging pile 3 is retracted into the buried pit 2, because the lifting rod 4 stops driving the supporting plate 5 to compress rainwater in the buried pit 2, the first push plate 101 squeezes rainwater in the first water storage tank 81 under elastic force of the first propulsion spring 91. Due to function of the first check valve 251, rainwater enters the first reserved tank 111 through the first conveying pipe 15 under squeeze of the first push plate 101. Since the lifting rod 4 stays at current position, the second push plate 102 is also restricted to current position, and the second extrusion plate 182 fixedly connected to the second push plate 102 is also restricted to current position, so rainwater in the second water storage tank 82 cannot enter the first reserved tank 111, the second propulsion spring 92 in the second water storage tank 82 is kept in a compressed state.

Figure 16:
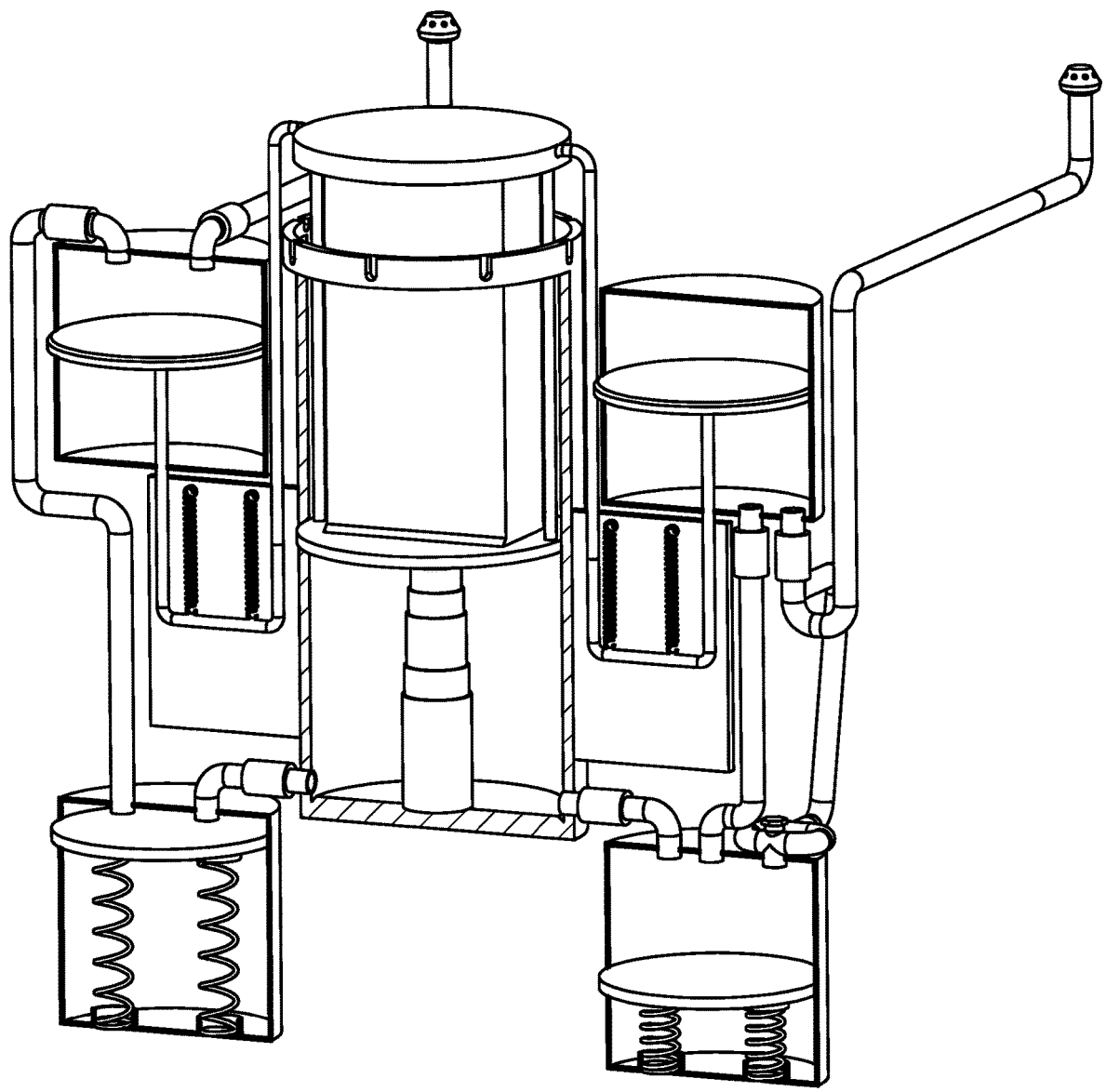
FIG. 16 is a sectional 3d-drawing of a charging pile during a ascent process.

Referring to FIG. 16, when the charging pile 3 moves up again, the first driving plate 171 is reset under elastic force of the first connecting spring 191, and then the first extrusion plate 181 is driven to move upward, so that upper space of the first reserved box 111 becomes smaller and lower space increases. In this state, rainwater originally stored in the first reserved box 111 is pushed by the extrusion plate 181, so that rainwater inside is sprayed through the first spraying pipe 14, and the green plant area 1 is watered through the first nozzle 241. Due to increased bottom space of the second reserved tank 112, rainwater inside the second storage tank 82 enters a bottom of the second reserved tank 82 through the second conveying pipe 13 under action of the second propulsion spring 92, realizing a pre-storage of rainwater by the second reserved tank 112. When the charging pile 3 moves down again, the second extrusion plate 182 squeezes rainwater, so that rainwater is sprayed out after passing through the second spraying pipe 12, and the green plant area 1 is watered again through the second nozzle 242.

When the charging pile 3 moves up, the first spraying pipe 14 is used for watering first, and the second reserved tank 112 connected with the second spraying pipe 12 reserves rainwater. When the charging pile 3 moves down, the second spraying pipe 12 is sprayed for irrigation, and the first reserved tank 111 connected with the first spraying pipe 14 reserves rainwater. The charging pile 3 waters the green plant area 1 twice during one process of completing a charge. Moreover, for office workers with a general life pattern, vehicles are generally used during the day and is charged at night, and vehicles will not be charged until the next morning. Therefore, watering time of the green plant area is basically fixed at all times, both in the morning and at night, which fully meets watering time of green plants, so that green plants in the green plant area 1 can be effectively watered, reducing cost of manpower watering, and making full use of rainwater. Erosion of the charging pile 3 by rainwater is avoided, and service life of the charging pile 3 is increased.

In a case of continuous heavy rainfall, the first water storage tank 81 and the second water storage tank 82 both may be filled with rainwater while there is still rainwater in the buried pit 2. In this state, the lifting rod 4 drives the supporting plate 5 to move downward and squeeze rainwater, so that pressure inside the second water storage tank 82 gradually increases, and finally causes the sliding block 23 to compress the limit spring 22 under pressure, causing the sliding block 23 to move into the spraying groove 20. When the second column portion 232 moves out of an inner wall of the spraying groove 20, the groove 233 communicates with the spraying groove 20, so that the second water storage tank 82 communicates with the spraying groove 20. Therefore, rainwater in the second water storage tank 82 flows out of the water supply pipe 21 through the spraying groove 20. Then excess rainwater enters the second spraying pipe 12 through the water supply pipe 21, and then is sprayed out from the second nozzle 242. Meanwhile excess rainwater in the first water storage tank 81 enters the first reserved tank 81 through the first conveying pipe 15, and rainwater is sprayed out from the first spraying pipe 14 as water pressure increases. It can be seen that when continuous heavy rainfall occurs, excess rainwater inside the buried pit 2 is directly sprayed out. Because there is more rain, water pressure is larger, so that spray coverage is wider, and it is not concentrated in a small area, so it does not cause damage to the green plant area 1. Synchronous spraying of the first spraying pipe 14 and the second spraying pipe 12 can quickly drain excess rainwater, so that the charging pile 3 can still quickly return to the buried pit 2, avoiding accidental impact events caused by staying on the ground for a long time after charging is completed, and then protect the charging pile 3.

The invention claimed is:

1. An underground charging pile for a new energy vehicle comprising:
   a green plant area (1) arranged on ground,
   a buried pit (2), and
   a charging pile (3);
wherein the buried pit (2) comprises a water storage device, the water storage device comprising two water storage tanks (8), the two water storage tanks (8) each in fluid communication with the buried pit (2), a first water storage tank (81) comprising two first propulsion springs (91), a second water storage tank (82) comprising two second propulsion springs (92), the two first propulsion springs (91) fixedly connecting to an inner bottom of the first water storage tank (81), the two second propulsion springs (92) fixedly connecting to an inner bottom of the second water storage tank (82), upper ends of the two first propulsion springs (91) both being connected to a first pushing plate (101), the first pushing plate (101) being in sealing and sliding connection with an inner wall of the first water storage tank (81), upper ends of the two second propulsion springs (92) both being connected to a second pushing plate (102), the second pushing plate (102) being in sealing and sliding connection with an inner wall of the second water storage tank (82), an upper end of the charging pile (3) fixedly connecting to a cover plate (7) which is in sealing and sliding connection with an inner wall of the buried pit (2), a bottom of the charging pile (3) fixedly connecting to a supporting, plate (5) which is in sealing and sliding connection with the inner wall of the buried pit (2), a lifting rod (4) and a corrugated pipe (6) being fixed between a lower portion of the supporting plate (5) and a lower portion of the buried pit (2), a water spraying device connecting to two side walls of the buried pit (2), the wafer spraying device comprising two reserved boxes (11), an upper end or one of the two reserved boxes (11) connecting to a first spraying pipe (14) and a first conveying pipe (15), a lower end of the first conveying pipe (15) in fluid communication with inside of one of the two water storage tanks (8), a lower end of another one of the two reserved boxes (11) connecting to a second spraying pipe (12) and a second conveying pipe (13), the second conveying pipe (13) in fluid communication with inside of another one of the two water storage tanks (8), a first nozzle fixedly connecting to an upper end of the first spraying pipe (14), a second nozzle fixedly connecting to an upper end of the second spraying pipe (12), the buried pit (2) comprising two pushing grooves (16) corresponding to the two reserved boxes (11), a first pushing groove (161) comprising a first driving structure inside, the first driving structure comprising a first connecting spring (191) fixed to an inner wall of an upper end of the first pushing groove (161), a lower end of the first connecting spring (191) fixedly connecting to a first driving plate (171), an upper end of the first driving plate (171) penetrating through a first reserved box (111) and fixedly connecting to a first extrusion plate (181) which is in sealing and sliding connection with an inner wall of the first reserved box (111), a second pushing groove (162) comprising a second driving structure inside, the second driving structure comprising a second connecting spring (192) fixed to an inner wall of an upper end of the second pushing groove (162), a lower end of the second connecting spring (192) fixedly connecting to a second driving plate (172), an upper end of the second driving plate (172) penetrating through a second reserved box (112) and fixedly connecting to a second extrusion plate (182) which is in sealing and sliding connection with an inner wall of the second reserved box (112).

\* \* \* \* \*